Figures 1, 2:
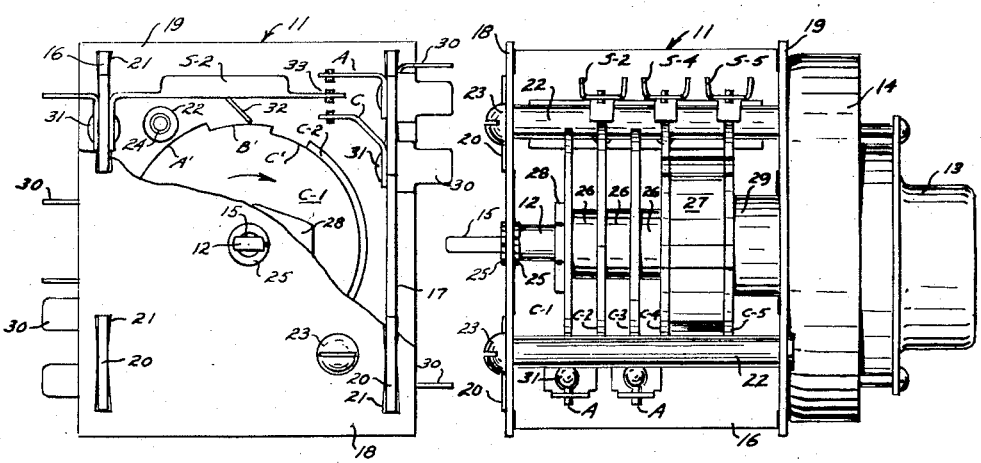

Oct. 7, 1958

M. E. ULLMAN, JR 2,855,477

TIME-SEQUENCE CONTROL

Filed Feb. 6, 1956

3 Sheets-Sheet 1

INVENTOR.

BY *Myron E. Ullman, Jr.*

*Daniel H. Dunbar*

ATTORNEY

Oct. 7, 1958     M. E. ULLMAN, JR     2,855,477

TIME-SEQUENCE CONTROL

Filed Feb. 6, 1956     3 Sheets-Sheet 2

INVENTOR.
Myron E. Ullman, Jr.
BY Daniel H. Dunbar
ATTORNEY

United States Patent Office 2,855,477
Patented Oct. 7, 1958

2,855,477

TIME-SEQUENCE CONTROL

Myron E. Ullman, Jr., Canfield, Ohio, assignor to American Radiator & Standard Sanitary Corporation, New York, N. Y., a corporation of Delaware Application February 6, 1956, Serial No. 563,544

3 Claims. (Cl. 200—38)

This invention relates to time-sequence controls and more particularly to an improved time-sequence control incorporating a time adjustment feature. Improved time-sequence controls of my invention have proved especially suitable for automatic dishwashing machines, automatic clothes washing machines, and like apparatus.

Washing machines of the automatic type introduce a quantity of water or other processing medium into the washing chamber of the unit one or more times during the period of a complete cycle of operation. The quantity of water or washing medium so delivered into the machine must be within prescribed maximum and minimum limits for satisfactory performance.

Heretofore, machines of this nature have generally utilized devices such as diaphragm-type pressure switches or float switches to serve as supplementary controls for the regulation of the washing medium supply means. Such devices are responsive to the actual quantity of medium introduced into the washing chamber and may be pre-set or located so as to assure a delivery of processing fluid within the established quantity limits.

Because water supply pressures often vary according to geographic locale it has not been feasible to introduce water into an apparatus washing chamber through an orifice opening of fixed size on a strict time basis. Conditions deemed typical for design purposes do not exist uniformly for all locations. In some localities, machines automatically filled with water solely on a time basis are found to be consistently deficient in quantity of water supplied and consequently deficient in performance.

However, I have discovered a means for making a time-sequence control adjustable. When my improved time-sequence control is used in an automatic washing machine to actuate water inlet means, compensation for various water supply pressure conditions might readily be made. Likewise, time compensation for other functions of the washing apparatus or functions of any apparatus in which my invention is used may readily be made.

I have found that my invention, when incorporated as a part of a washing apparatus' time-sequence control, eliminates the necessity of providing a supplementary water supply regulating control. Use of my invention permits use of the time-sequence control, which normally is required in all units of this nature, to directly and solely actuate the water inlet supply means without sacrificing adequate performance. Economical advantages are attained and numerous sources of maintenance difficulty are abolished with elimination of the supplementary control means.

Other advantages of my invention are apparent from a detailed study of the description and drawings.

Figures 3, 4, 5:
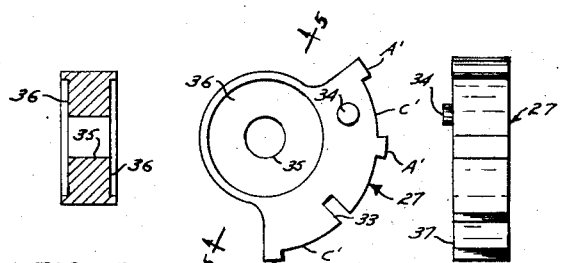
Figures 6, 7:
Figures 8, 9:
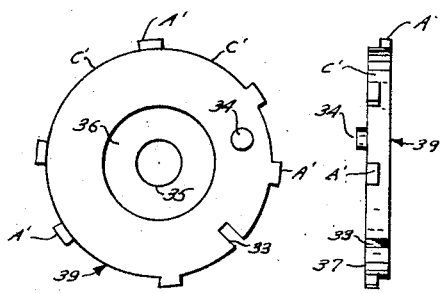

Fig. 1 is a partially broken front elevation of a time-sequence control; Fig. 2 is a side elevation of portions of the time-sequence control shown in Fig. 1; Fig. 3 is a front elevation of a preferred form of cam member component of my invention; Fig. 4 is a side elevation of Fig. 3; Fig. 5 is a sectional view taken along line 5—5 of Fig. 3; Figs. 6 and 7 are front and side elevational views respectively of a spring washer suggested for use in my invention; Figs. 8 and 9 are front and side elevational views respectively of an alternate form of the cam member component of my invention; Figs. 10 through 17 show various relative positions of my invention's component cam members; and Figs. 18 through 21 show relative component cam positions using the alternate cam form of Figs. 8 and 9; Fig. 22 is a schematic electrical wiring diagram for a dishwashing machine in which my invention may be advantageously employed; and Fig. 23 is a chart showing one form of a time-sequence control program suitable for automatic dishwashing machines.

In Figs. 1 and 2 a time-sequence control 11 is shown in elevation. It is comprised essentially of shaft member 12, cams C–1 through C–5 secured to shaft 12, switch blades S–1 through S–5 actuated by cams C–1 through C–5 respectively, contact points A and C for each of switch blades S–1 through S–5, and timer motor 13 coupled to shaft 12 through a reduction gear train contained in housing 14. Time-sequence control 11 is further comprised of mounting panels 16 and 17 and end plates 18 and 19. In Fig. 1 a broken portion of end plate 18 has been removed and in Fig. 2 mounting panel 17 has been removed. Switch blades S–1 and S–3 are secured to mounting panel 17 and hence do not appear in Fig. 2. Because timer motors of the synchronous type and reduction gear trains are well known they are not minutely detailed in the drawings.

Each of mounting panels 16 and 17 is provided with end tabs 20 which register with and project through slots 21 in end plates 18 and 19. Posts 22 serve as spacers and may be rigidly secured to end plate 19 by staking. Mounting panels 16 and 17 are assembled into end panels 18 and 19 and the sub-assembly held together by means of screw fasteners 23, the bodies of which pass through end plate 18 into threaded holes 24 in the end of posts 22. The timer motor and reduction gear train assembly may be fastened to end plate 19 by any of a number of well known methods. Shaft 12 is axially aligned by engagement with bearing holes in end plate 18 and in a support plate for gear train 14 (not shown). Shaft 12 is slidably restrained by means of split retaining rings 25.

Figure 10:
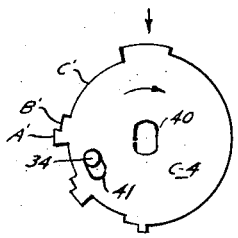

Cams C–1 through C–5 are separated by a series of spacers 26 and by adjustment cam 27 which is a dominant feature of my invention. Cams C–1 through C–5 must be rotationally locked with respect to shaft 12. Use of a "double-D" flatted shaft portion and a cooperating cam mounting hole such as that shown at 40 in Fig. 10 is satisfactory. When assembling the shaft and cams into a sub-assembly a stop plate 28 and press-fit sleeve 29 are used to prevent relative axial movement of the parts. Stop plate 28 has a mounting hole similar to mounting hole 40 of cam C–4 shown in Fig. 10 and when assembled bears against a shoulder on shaft 12. Shaft 12 has a flatted portion 15 upon which a knob or dial may be located for manual rotation of shaft 12.

Mounting panels 16 and 17 are made of a dielectric material and serve as bases for mounting switch blades S–1 through S–5, contact tabs A and C for each of switch blades S–1 through S–5, and terminal tabs 30. Assembly of these component parts may be by use of rivets 31. Switch blade members S–1 through S–5 must be so formed that when properly assembled their blade contact point 33 is urged into positive contact with the corresponding contact point C for that switch.

Any of cam members C–1 through C–5 may be provided with peripheral contact surfaces, such as portions A′, B′, and C′, of cam C–1 shown in Fig. 1, having three different radii about the center of the cam. This type of cam is shown without obstruction in Fig. 10. The radii of each cam member are selected so that, provided the control is properly assembled, its corresponding switch blade contact point 33 will: (1) remain in positive contact with its contact tab C when end of switch blade arm 32 is in contact with cam surface portion C', (2) assume a position intermediate contact tabs A and C when end of switch blade arm 32 is in contact with cam surface portion B', and (3) assume positive contact with contact tab A when end of switch blade arm 32 is in contact with cam surface portion A'.

As cam members C–1 through C–5 are rotated clockwise the switch blade contact point of each switch blades S–1 through S–5 will be in one of three distinct positions. The exact timing and pattern of switch blade contact point movements is dependent upon the rotative speed of shaft 12 and the peripheral shape and relative rotational position of each cam.

In Fig. 3 I show the adjustable cam component of my invention in one form. In Fig. 2 adjustment cam 27 is placed intermediate two cams of time-sequence control 11. The peripheral portions A' and C' of adjustment cam 27 cooperate with the end of switch blade arm 32 in a manner identical to surface portions A' and C' of cam members C–1 through C–5 as described above. The specific peripheral shape shown in Fig. 3 may be modified to meet any of a number of time-sequence pattern objectives; if desired, it may be provided with a peripheral surface portion equivalent in function to cam surface portion B' previously described.

Adjustment cam 27 is further provided with: slot 33, boss 34, mounting hole 35, and recessed portions 36. Slot 33 is provided to facilitate the adjusting movement of the cam. Boss 34 may be molded integral with adjustment cam 27; it is engaged in a slot in the cam member adjacent its surface 37 and serves as a stop to limit the degree of rotative movement. This arrangement is shown more clearly by a comparison of Figs. 10 and 14.

Recesses 36 are provided to receive friction creating means such as the spring washer 38 of Figs. 6 and 7. The curvature, thickness, and material of spring washer 38 should be such that, provided the shaft and cam members are properly assembled, adjustment cam 27 can be rotated with respect to shaft 12 such as by applying a restraining force to adjustment cam 27 through a screwdriver or other like instrument inserted in slot 33 and then applying a torque to shaft 12 and the cam members rotationally locked thereto. At the same time the frictional resistance must be great enough to prevent any possibility of the position of adjustment cam 27 being changed by virtue of its operational contact with any switch blade arms 32. It should be noted that mounting hole 35 of adjustment cam 27 is round and hence this mounting hole does not restrict adjustment cam member 27 rotatively on shaft 12 as do the mounting holes 40 of cam members C–1 through C–5 shown in Figs. 10 through 21.

An alternate form of adjustment cam is shown at 39, Figs. 8 and 9. This particular form may be adopted when it is desired that the adjustment cam be located between adjacent cams such as cam members C–2 and C–3 of Fig. 2. In this arrangement the corresponding switch blades S–2 and S–3 are located 180° apart with respect to the axis of shaft 12. The reference numerals of Figs. 8 and 9 refer to portions of adjustment cam 39 identical in function and equivalent to similar portions of adjustment cam 27 numbered correspondingly.

Switch blade arms 32 of switch blades S–4 and S–5 extend beyond the surface edges of their respective cams C–4 and C–5 and into the zone of rotation of adjustment cam 27. It is because of this arrangement that my invention is made operable. The peripheral surface portions A' of adjustment cam 27 correspond in position and extend to the peripheral portions A' of the cam members C–4 and C–5 located adjacent either side of adjustment cam 27. Such being the case, adjustable cam 27 does not alter the movement pattern of either switch blade S–4 or switch blade S–5 when properly aligned with cams C–4 and C–5. However, if adjustment cam 27 is rotated with respect to cams C–4 and C–5, an extended contact surface portion A' is presented to switch blades S–4 and S–5 and their movement pattern is distinctly altered. This matter is discussed again in that portion of the description referring to Figs. 10 through 21.

Adjustment cam 27 and its alternate form 39 as shown in Figs. 8 and 9 are designed to actuate the switch blade associated with each cam member located immediately adjacent either side of the adjustment cam. However, this arrangement may not always be desired. If it is preferred that adjustment cam 27 or 39 actuate only one switch blade, contact surface portions A' can be modified accordingly.

In Figs. 10 through 17 I show the relative cam positions of combinations of cam members C–4 and C–5, and adjustment cam 27 both before and after an adjustment for time compensation has been made. In each case the cam components as illustrated have a peripheral surface pattern which will cause the switching pattern for their associated switches prescribed by the chart of Fig. 23. Vertically positioned arrows in each figure indicate the point of cam contact with the end of switch blade arm 32 of the properly associated switch blade.

In Fig. 10, cam C–4 and adjustment cam 27 are viewed in elevation from the front of the time-sequence control. Cam mounting hole 40, cam limit slot 41, adjustment cam boss 34, and direction of rotation are illustrated. As stated above cam surface portions A', B', and C' act upon switch blade S–4 to produce the desired switching pattern. Because peripheral surface portions of adjustment cam 27 do not alter the switching pattern of cam C–4 when the two are in proper alignment, no peripheral surface portion of adjustment cam 27 appears separately in Fig. 10. However, the presence of adjustment cam 27 is clearly disclosed in Fig. 11 which is a view of the components of Fig. 10 taken from their opposite side. Surface portions C' of adjustment cam 27 may be of lesser radius than surface portions C' of cam C–4 as shown in Fig. 11 without undesirably affecting performance of the arrangement.

Figure 11:
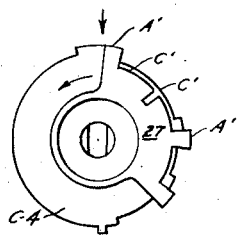
Figure 12:
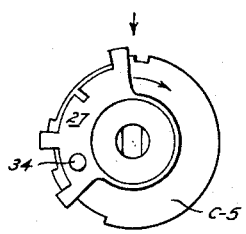
Figure 13:
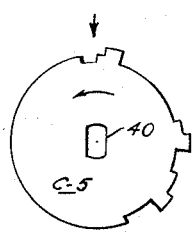

Figs. 12 and 13 are identical in nature to Figs. 10 and 11 except that they illustrate the relative positions of adjustment cam 27 and cam C–5 when viewed in like directions. No separate peripheral surface portion of adjustment cam 27 is observed in Fig. 13 because of the effect of proper alignment of the components as previously stated.

Figure 14:
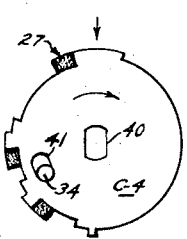
Figure 15:
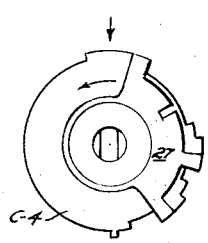

Figs. 14 and 15 are similar in arrangement to Figs. 10 and 11 except that they illustrate relative positions of cam C–4 and adjustment cam 27 after an adjustment for time compensation has been made. In Fig. 14 those portions of adjustment cam 27 which have come into view from behind cam C–4 are indicated by stippled shading. As shown in this view an extended peripheral surface portion A' is now presented to cooperate with the end of switch blade arm 32 of switch blade S–4 in the manner previously described. It should be noted that boss 34 of adjustment cam 27 has now changed its relative position in slot 41 of cam C–4. Fig. 14 shows that adjustment cam 27 has been rotated to its limit with respect to cam C–4 but boss 34 might equally as well assume any position intermediate the ends of slot 41.

Figure 16:
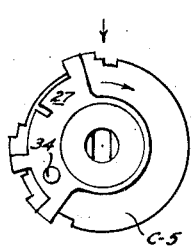
Figure 17:
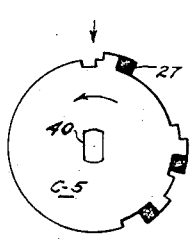

Figs. 16 and 17 are similar in nature to Figs. 14 and 15 except that they illustrate the relative position of adjustment cam 27 and cam C–5 when viewed in like directions but after an adjustment for time compensation has been made. Again those portions of adjustment cam 27 which have come into view from behind cam C–5 are indicated by stippled shading in Fig. 17.

Figure 18:
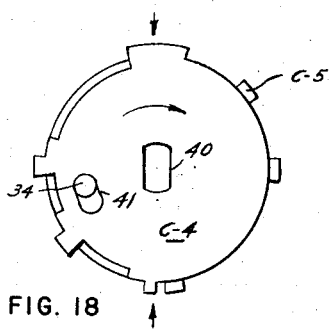
Figure 19:
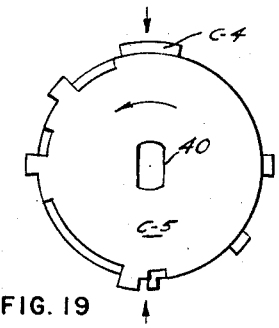

In Figs. 18 thorugh 21 I show elevations of cams C–4 and C-5 when combined with alternate form adjustment cam 39 in both before and after positions. Figs. 18 and 19 are front and back views of the combination when all members are in proper initial alignment. As previously explained, the peripheral contact surface portions of adjustment cam 39 are co-extensive with peripheral contact surface portions of cams C-4 and C-5 and hence do not appear separately in Figs. 18 and 19.

Figure 20:
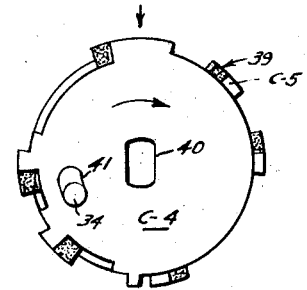
Figure 21:
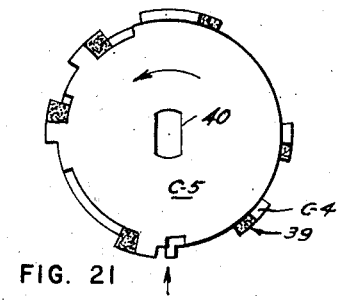
Figures 22, 23:
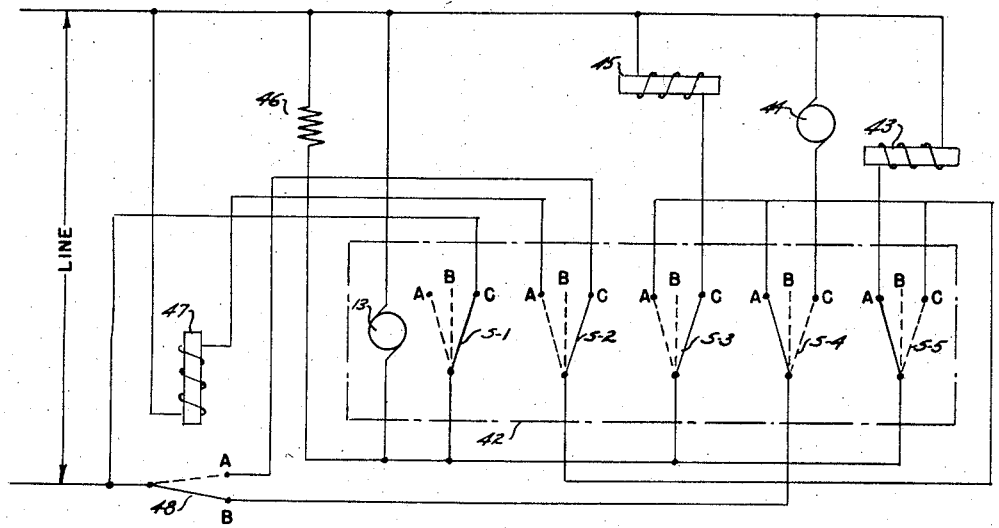

In Figs. 20 and 21 the combination of cams is shown after adjustment cam 39 has been rotated to its opposite limit relative to cams C-4 and C-5. Again those portions of adjustment cam 39 which have come into view from behind cam C-4 or cam C-5 are indicated by stippled shading.

As previously suggested a time-sequence control incorporating my improvements is particularly adaptable to automatic washing apparatus such as automatic dishwashing machines, automatic clothes washing machines, and the like. In Fig. 22 I show a schematic wiring diagram for an automatic dishwashing machine. The time-sequence control portion is shown generally within the confines of dash-dot-dash line 42; being the equivalent in function to previously described time-sequence control 11 it has a series of switch blades S-1 through S-5 actuated by cams similar to cams C-1 through C-5. Its timer motor is represented at 13.

In addition, washing apparatus of this type has: (1) a solenoid 43 motivating washing medium inlet supply means which may take the form of a normally closed valve located intermediate the apparatus washing chamber and a pressurized source of washing medium, (2) a motor 44 motivating the machine's washing function which may be accomplished by a recirculated washing medium pumped through a spray arrangement or by an impeller or an agitator operating in the washing medium, (3) a solenoid 45 motivating a drain valve which is in communication with the apparatus washing chamber and a place of disposal, (4) a heating element 46 provided to elevate temperatures within the apparatus washing chamber, (5) a solenoid 47 motivating a door-opening mechanism, and (6) a door switch 48 serving to assist in initiating the machine operating cycle and providing auxiliary safety features. These various machine components are motivated by an electrical energy source (referred to as Line in Fig. 22) and are wired to the time-sequence control. Individual leads may be provided with a solderless type fitting which are then connected to terminal tabs such as those shown at 30 in Figs. 1 and 2. The arrangement of terminal tabs 30 on mountnig panels 16 and 17 is determined by the specific circuiting arrangement desired for the washing apparatus.

The pattern of movement of switch blades S-1 through S-5 may take the pattern shown by the chart of Fig. 23. In this chart the solidly shaded block portions indicate intervals during which the switch blade contact point is in the position designated. The program shown is for a 360° rotation of the cam members. The duration of any particular interval is dependent upon the rotative speed of the cam shaft and the desired rate of rotation can be obtained through selection of a proper gear train arrangement.

A detailed study of Figs. 22 and 23 with reference to switch blades S-4 and S-5 and dishwashing machine elements 43 and 44 further points up the operational characteristics of my invention. Switch blade S-4 must be in the "C" position to actuate motor 44 and switch blade S-5 must be in the "A" position to actuate solenoid 43 to cause washing medium to be supplied to the machine washing chamber.

Referring to Figs. 14 and 17 or Figs. 20 and 21 it will be observed that when adjustment cam 27 or 39 is moved to its limit stop the peripheral contact surfaces are extended to prevent the end of the switch blade arm 32 from dropping off contact surface portions A' of either cam C-4 or cam C-5. The effect of the adjustment is to prolong the dwelling of switch blades S-4 and S-5 in the "A" position. This in turn causes the washing medium supply means to be actuated for a longer period of time and delays the initiation of the washing function of the machine. These extended periods are indicated in the chart of Fig. 23 by blocks containing an "X" therein. As previously explained the peripheral contact surface of adjustment cam 27 or 39 can be modified to actuate only one switch blade if such is desired.

What I claim as new and desire to secure by Letters Patent of the United States is:

1. In a time-sequence control, the combination comprising a rotatable shaft member, a plurality of cam members nonrotatably mounted on said shaft member, bushings between some of said cam members spacing said cam members longitudinally on said shaft member, and an adjustment cam member journalled on said shaft between a pair of said cam members and spacing said pair of cam members, and friction means between said adjustment cam member and at least one of said pair of cam members tending to prevent relative rotation between said adjustment cam member and said cam members, said adjustment cam member being selectively manually rotatable relative to said cam members on said shaft member and cooperating with at least one of said cam members.

2. The combination set forth in claim 1 wherein one of said pair of cam members is provided with an annular slot, said adjustment member having a projection extending axially into said slot for limiting the manual rotatable adjustment of said adjustment member relative to said cam member.

3. The combination set forth in claim 2 wherein said friction means comprises an annular slot in said adjustment cam member surrounding said shaft and a spring washer seated in said annular slot and compressed between said adjustment cam member and said cam member.

References Cited in the file of this patent

UNITED STATES PATENTS

| | | |
|---|---|---|
| 507,785 | Cook et al. | Oct. 31, 1893 |
| 1,708,619 | Hart | Apr. 9, 1929 |
| 1,710,367 | Luczak | Apr. 23, 1929 |
| 1,851,246 | Hall | Mar. 29, 1932 |
| 1,989,522 | McWhirter | Jan. 29, 1935 |
| 2,050,614 | Kerr | Aug. 11, 1936 |
| 2,249,237 | Fulton | July 15, 1941 |
| 2,487,286 | Wagner | Nov. 8, 1949 |
| 2,603,287 | Midgley | July 15, 1952 |
| 2,776,009 | Tamburr | Jan. 1, 1957 |